Patented Dec. 26, 1922.

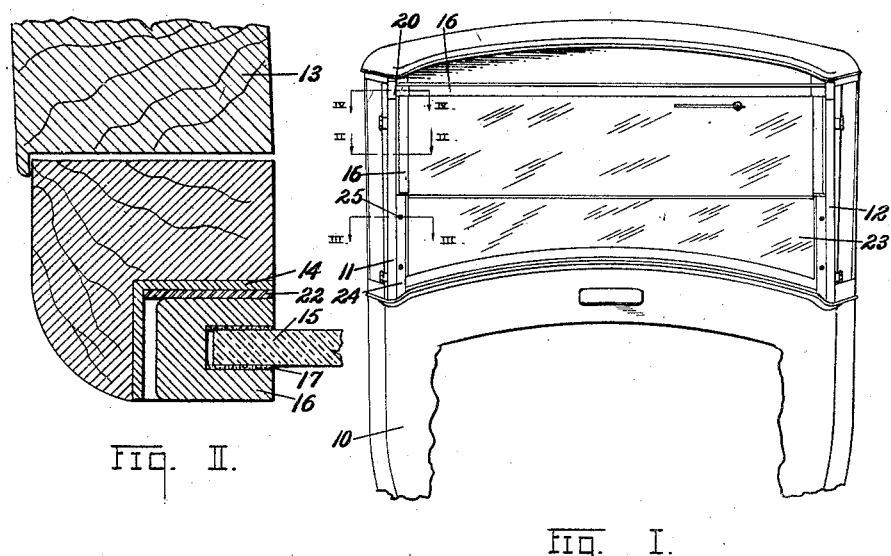
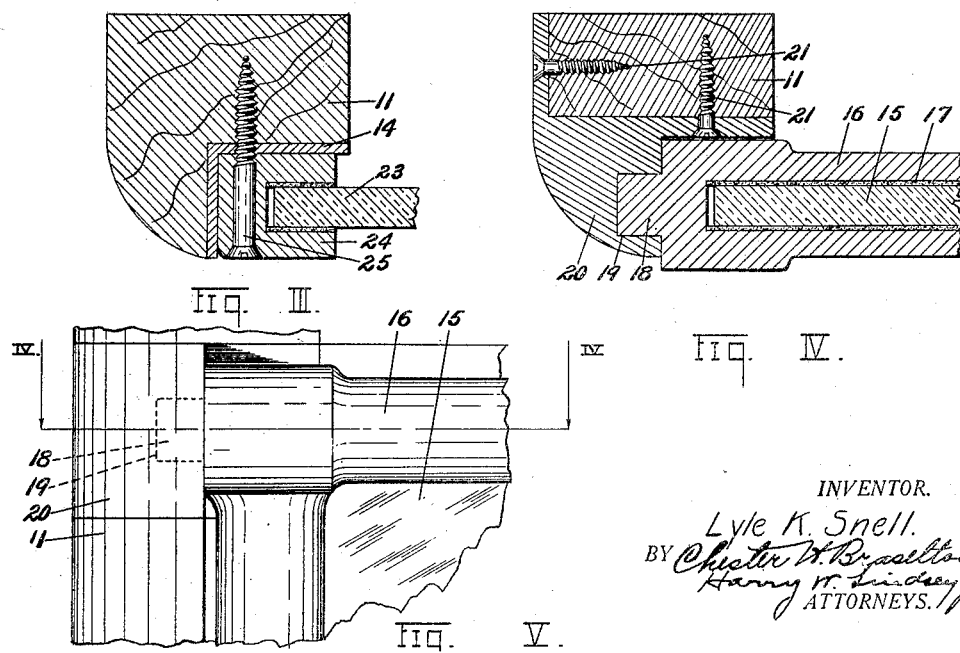

1,439,919

UNITED STATES PATENT OFFICE.

LYLE K. SNELL, OF TOLEDO, OHIO, ASSIGNOR TO THE WILLYS-OVERLAND COMPANY, OF TOLEDO, OHIO, A CORPORATION OF OHIO.

AUTOMOBILE BODY.

Application filed February 26, 1921. Serial No. 448,139.

*To all whom it may concern:*

Be it known that I, LYLE K. SNELL, residing at Toledo, in the county of Lucas and State of Ohio, have invented certain new and useful Improvements in Automobile Bodies, of which I declare the following to be a full, clear, and exact description.

This invention relates to improvements in automobile bodies, particularly means for utilizing the forward door post of a closed body as a windshield post.

One object of the invention is the reduction in cross-section of the sight barriers at the forward corners of the automobile. Where the windshields are vertical these barriers ordinarily consist of the door posts together with the windshield posts, the latter being attached to the door posts and extending inwardly therefrom. I reduce the size of this sight barrier by a construction which, in effect, puts the windshield post into the door post so that the two things take up no more room and form no more of a sight barrier than did the door post alone in the former construction.

Another object is the provision of a construction which is of neat appearance and low cost.

Other objects, and objects relating to details of construction and economies of manufacture, will appear as I proceed with the description of that embodiment of the invention which, for the purposes of the present application, I have illustrated in the accompanying drawings, in which:

Figure I is a vertical elevation partly broken away of a closed automobile body embodying my invention.

Figure II is a cross section taken substantially on the line II—II of Figure I showing the combined windshield and door post with the upper or movable section of the windshield in place.

Figure III is a similar view taken on line III—III of Figure I illustrating the lower, fixed windshield section.

Figure IV is a cross-sectional view through the upper end of the post and one of the trunnions of the movable windshield section.

Figure V is a fragmentary view in front elevation, showing an upper corner of the movable windshield section together with the casting in which it is pivoted.

Like reference characters refer to similar parts throughout the views.

In the drawings, 10 represents the body proper of an automobile of the closed body type, having forward door posts 11 and 12 against which doors 13 are adapted to swing. On its forward inner side each post 11 is rabbeted and the rabbet is preferably lined with a metallic backing 14.

The upper windshield section consists of a sheet of glass 15 bound around its sides and top in a metallic frame 16, strips of felt 17 being interposed between the glass and metal in the usual manner.

At the upper corners the frame 16 is formed with outwardly extending trunnions 18 which are rotatably mounted in sockets 19 formed in a casting 20 which is secured by means of screws 21 to a constricted portion of the post 11. The dimensions and shape of the constricted portion and of the casting are such as to make the surface of the casting flush with the surface of the post. When the upper windshield section is swung down into closed position the side elements of the frame 16 bear against cushions 22, preferably of rubber.

The lower section 23 of the windshield has side binding elements 24 similar in cross-section to the frame elements of the upper windshield section. These elements 24 are permanently attached to the post 11 by any suitable means, as for instance by wood screws 25 passing through holes in the metal backing 14 and into the wood of the post.

It will be apparent from the foregoing that by virtue of my construction a considerably smaller barrier is interposed between the occupants of the automobile and the road ahead than was the case in the former customary construction. This will be the fact even though it becomes necessary to make the cross-sectional dimension of the post from front to rear slightly greater than formerly for the sake of providing the necessary strength.

I am aware that the embodiment of my invention herein shown and described is susceptible of various modifications without departing from the spirit of the invention, and therefore I desire to claim it broadly as well as specifically as indicated by the appended claims.

Having thus described my invention, what

I claim as new and desire to secure by Letters Patent, is:

1. In an automobile of the closed body type, a combined door and windshield post rabbeted on its forward inner side to receive the side member of a windshield frame.

2. In an automobile of the closed body type, a combined windshield and door post rabbeted on its forward inner side throughout the greater portion of its height to receive the side members of the windshield, the upper end of the post being of reduced size, a casting mounted upon the reduced portion and shaped to be flush with the remainder of the post and a windshield having a pivotal connection with said casting.

3. In an automobile of the closed body type, a forward door post rabbeted on its forward inner side in order to serve also as a windshield post, and a side frame member of a windshield lying within the said rabbet.

4. In an automobile of the closed body type, forward door posts rabbeted on their forward inner sides in order to serve also as windshield posts, a lower windshield section having side members secured entirely within said rabbet and an upper windshield section having side members adapted to swing into and out of said rabbet.

5. In an automobile of the closed body type, forward door posts rabbeted on their forward inner sides in order to serve also as windshield posts, a lower windshield section having side members secured entirely within said rabbet and an upper windshield section having side members also adapted to lie entirely within said rabbet, said upper section being provided with trunnions rotatably mounted in said posts.

6. In an automobile of the closed body type, a combined windshield and door post comprising a substantially vertical member, one face of which is adapted to engage a door, and having another face provided with a recess for receiving a windshield.

In testimony whereof I affix my signature.

LYLE K. SNELL.